United States Patent
Wang et al.

(10) Patent No.: US 10,257,152 B2
(45) Date of Patent: Apr. 9, 2019

(54) SUPPRESSING ARP BROADCASTING IN A HYPERVISOR

(71) Applicant: Nicira, Inc., Palo Alto, CA (US)

(72) Inventors: Yonggang Wang, Beijing (CN); Keyong Sun, Beijing (CN); Frank Guo, Beijing (CN); Dousheng Zhao, Beijing (CN); Liang Li, Beijing (CN)

(73) Assignee: Nicira, Inc., Palo Alto, CA (US)

(*) Notice: Subject to any disclaimer, the term of this patent is extended or adjusted under 35 U.S.C. 154(b) by 75 days.

(21) Appl. No.: 15/455,580

(22) Filed: Mar. 10, 2017

(65) Prior Publication Data
US 2018/0262459 A1 Sep. 13, 2018

(51) Int. Cl.
*H04L 29/12* (2006.01)
*H04L 12/741* (2013.01)

(52) U.S. Cl.
CPC .......... *H04L 61/103* (2013.01); *H04L 45/54* (2013.01); *H04L 45/745* (2013.01); *H04L 61/2015* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 5,550,816 A * | 8/1996 | Hardwick | H04L 12/4604 370/397 |
| 6,438,129 B1 * | 8/2002 | Jennings | H04L 29/12009 370/389 |
| 7,406,630 B1 * | 7/2008 | Gill | G06Q 20/1085 705/43 |
| 7,774,498 B1 * | 8/2010 | Kraemer | H04L 63/20 709/224 |
| 7,787,416 B2 * | 8/2010 | Gidwani | H04W 28/18 370/310 |
| 9,419,895 B2 * | 8/2016 | Liu | H04L 45/745 |
| 2003/0202513 A1 * | 10/2003 | Chen | H04L 12/462 370/390 |
| 2007/0028133 A1 * | 2/2007 | Izutsu | H04L 67/104 714/4.11 |
| 2007/0088822 A1 * | 4/2007 | Coile | H01R 31/005 709/224 |
| 2007/0140235 A1 * | 6/2007 | Aysan | H04L 45/00 370/389 |
| 2008/0025207 A1 * | 1/2008 | Akahane | H04Q 3/0079 370/217 |
| 2008/0077690 A1 * | 3/2008 | Miyajima | G06F 9/5088 709/226 |

(Continued)

*Primary Examiner* — Bunjob Jaroenchonwanit
(74) *Attorney, Agent, or Firm* — Patterson + Sheridan, LLP

(57) ABSTRACT

Aspects of the present disclosure provide a method for processing address resolution protocol (ARP) packets in a computing environment. The method includes the steps of maintaining a table mapping internet protocol (IP) addresses to port identifiers (port IDs), receiving a packet, determining a type of the received packet, based on the type of the received packet being a first type, checking whether a destination IP address in the received packet matches an entry in the table, and if the destination IP address in the received packet matches an entry in the table: determining a port ID associated with the matching entry, and forwarding the received packet over a port associated with the determined port ID.

20 Claims, 5 Drawing Sheets

(56) References Cited

U.S. PATENT DOCUMENTS

| | | | | |
|---|---|---|---|---|
| 2008/0089238 A1* | 4/2008 | Fahmy | H04L 63/0236 | 370/252 |
| 2009/0083445 A1* | 3/2009 | Ganga | G06F 15/16 | 709/250 |
| 2009/0213859 A1* | 8/2009 | De Silva | H04L 12/4625 | 370/395.53 |
| 2010/0257269 A1* | 10/2010 | Clark | G06F 9/4856 | 709/226 |
| 2013/0177028 A1* | 7/2013 | Lebizay | H04L 29/06 | 370/466 |
| 2013/0230047 A1* | 9/2013 | Subrahmaniam | H04L 47/2441 | 370/392 |
| 2013/0287028 A1* | 10/2013 | Ashwood-Smith | H04L 45/74 | 370/392 |
| 2013/0332983 A1* | 12/2013 | Koorevaar | H04L 63/20 | 726/1 |
| 2014/0064089 A1* | 3/2014 | Goel | H04L 47/125 | 370/235 |
| 2014/0119373 A1* | 5/2014 | Barabash | G06F 9/45558 | 370/392 |
| 2015/0058967 A1* | 2/2015 | Ringdahl | H04L 63/0254 | 726/11 |
| 2015/0331777 A1* | 11/2015 | Lvin | H04L 41/065 | 707/694 |
| 2015/0381560 A1* | 12/2015 | Chippa | H04L 67/1095 | 709/226 |
| 2015/0381569 A1* | 12/2015 | Visser | H04L 63/0272 | 726/15 |
| 2016/0191545 A1* | 6/2016 | Nanda | H04L 43/062 | 726/1 |
| 2016/0226818 A1* | 8/2016 | Kamath | H04L 9/08576 | |
| 2017/0180155 A1* | 6/2017 | Shanks | H04L 12/4633 | |
| 2017/0180213 A1* | 6/2017 | Li | H04L 29/08 | |
| 2017/0295207 A1* | 10/2017 | Yu | H04L 29/06 | |
| 2018/0124074 A1* | 5/2018 | Natarajan | H04L 63/1416 | |

* cited by examiner

SUPPRESSING ARP BROADCASTING IN A HYPERVISOR

BACKGROUND

A plurality of hosts may be in communication over a physical network infrastructure, each host having one or more virtualized endpoints such as virtual machines (VMs) or containers that are part of a network. Certain aspects described may be discussed with respect to VMs, however, it should be understood that such aspects can also be applied to other virtual computing instances (e.g., virtual machines (VMs), containers (e.g., Docker containers), data compute nodes, isolated user space instances, etc.). In hosting VMs, a host machine may provide a virtual switch that connects virtual machines running on the host to communicate with other VMs hosted on the same host machine as well as VMs hosted on other hosts.

In certain aspects, the network is a layer-2 (L2) network where frames (e.g., a data frame, a packet, etc.) are forwarded (e.g., by virtual switches) based on a destination media access control (MAC) address included in the frame. The term "layer-2" generally refers to a data link layer (e.g., MAC or Ethernet layer), "layer-3" to a network layer (e.g., IP layer), and "layer-4" to a transport layer (e.g., Transmission Control Protocol (TCP) layer) in the OSI model, although the concepts described herein and referred to simply as "L2" or "MAC" and "L3" or "IP" may be applicable to corresponding layers in other networking models.

Accordingly, in certain aspects, for a source virtual machine to send a frame to a destination virtual machine, the source virtual machine includes a destination MAC address of the destination virtual machine in a header of the frame. Accordingly, if the source virtual machine does not have a destination MAC address but rather only a destination IP address of the destination virtual machine, a source virtual machine may need to convert the IP address to a MAC address. The source virtual machine may use Address Resolution Protocol (ARP) to determine the MAC address of the destination virtual machine. When a source virtual machine wants to send data, the virtual machine searches its ARP cache to try to determine the MAC address corresponding to the destination IP address of the destination virtual machine. If the source virtual machine is unable find such an entry, an ARP request packet may be broadcasted to all the machines in the network to resolve the destination IP address. After the destination virtual machine receives the ARP request packet, it may send back an ARP reply packet with its MAC address. The two virtual machines may then begin communicating with each other.

SUMMARY

Aspects of the present disclosure provide a method for processing address resolution protocol (ARP) packets in a computing environment. The method includes the steps of maintaining a table mapping internet protocol (IP) addresses to port identifiers (port IDs), receiving a packet, determining a type of the received packet, based on the type of the received packet being a first type, checking whether a destination IP address in the received packet matches an entry in the table, if the destination IP address in the received packet matches an entry in the table, determining a port ID associated with the matching entry, and forwarding the received packet over a port associated with the determined port ID.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
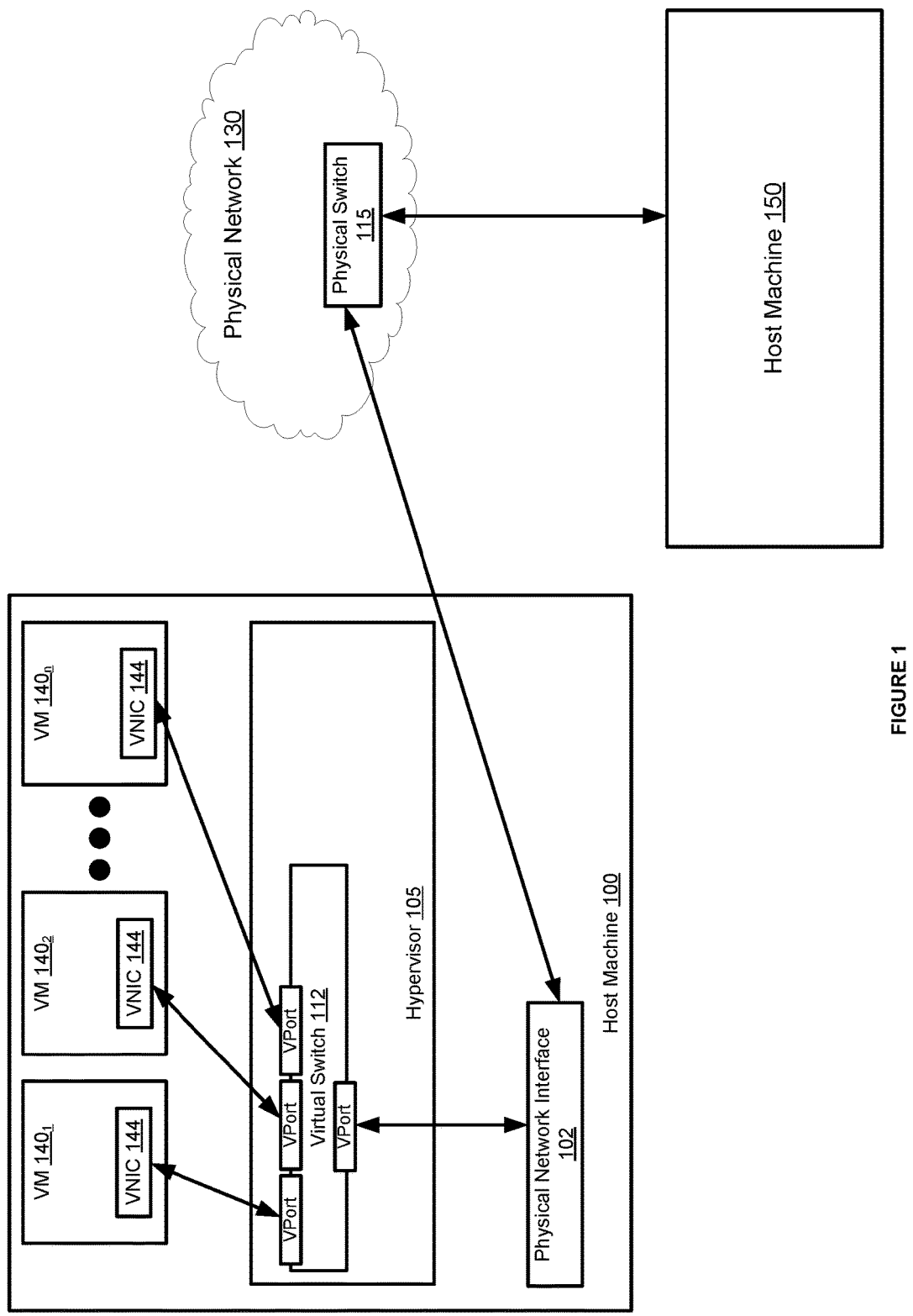
FIG. 1 is a block diagram of a computing environment in which address resolution protocol requests may be processed, according to some embodiments.

FIG. 1 illustrates an example host machine 100, according to some embodiments. As illustrated, host machine 100 includes a physical network interface 102, hypervisor 105, firewall engine 110, and one or more virtual machines 140. Host machine 100 has access to a physical network 130 through physical network interface 102. Host machine 100 is capable of communicating with other host machines (e.g., host machine 150) via physical network 130, for example, using one or more physical switches 115 in physical network 130.

Hypervisor 105, which, as illustrated, includes a virtual switch 112 in a kernel space of the hypervisor, serves as an interface between hosted virtual machines 140 and physical network interface 102, as well as other physical resources available on host machine 100. In alternate embodiments, virtual switch 112 and physical device drivers, may execute in a privileged virtual machine. The privileged virtual machine may be referred to variously as a "Domain zero," "root-partition," or "parent-partition."

Further, each virtual machine 140 may exist in a user space of a hypervisor, including hypervisor 105, or another hypervisor installed on a different physical device than hypervisor 105. Multiple virtual machines 140 may exist on a single hypervisor.

Each hypervisor (e.g., hypervisor 105 or other hypervisors associated with virtual machines 140) may be installed on a separate hardware platform and provide operating system functionality (e.g., process creation and control, file system, process threads, etc.) as well as central processing unit (CPU) scheduling and memory scheduling across multiple virtual machine execution spaces within the hypervisor. A virtual machine process is executed within each virtual machine execution space to manage a virtual hardware platform for a virtual machine 140. A virtual machine monitor may be associated with each virtual machine 140 and coordinate operations between the hypervisor and virtual machine 140.

Virtual machines 140 may host a plurality of workloads which may be used by one or more users to generate network traffic and transmit the network traffic to destinations in one or more networks that host machine 100 is a member of. As illustrated, each virtual machine 140 includes a virtual network interface card (VNIC) 144, which is responsible for exchanging packets between virtual machine 140 and hypervisor 105. VNICs 144 may be, in some cases, a software abstraction of a physical network interface card implemented by an emulator and may include a firewall filter for identifying relevant firewall rules and applying the relevant firewall rules for filtering packets. Each virtual machine 140 is connected to a virtual port provided by virtual switch 112, and virtual switch 112 is connected to physical network interface 102 by a virtual port provided by virtual switch 112. Virtual switch 112 forwards traffic from a virtual machine 140 to different virtual ports according to a forwarding policy to allow network traffic to be exchanged between virtual machines 140 executing on host machine 100 and external network destinations, such as other host machines connected to physical network 130 (e.g., host machine 150) and virtual machines executing on such other host machines.

In some cases, a virtual machine 140 may wish to communicate with other virtual machines, executing on the same host machine or other hosts, or other entities in physical network 130. As discussed, the virtual machine 140 may need to include a destination MAC addresses of the destination virtual machine to send packets to the destination virtual machine. Virtual machine 140, however, may have the IP address of the destination virtual machine and need to determine the MAC address of the destination virtual machine. Accordingly, when the virtual machines communicate with each other, they may convert IP addresses to MAC addresses. An Address Resolution Protocol (ARP) may be used for this purpose.

For example, when a virtual machine 140 wants to send data, it may search its ARP cache to try to determine the MAC address corresponding to the destination virtual machine's IP address. If virtual machine 140 cannot find such an entry in its ARP cache, virtual machine 140 may send an ARP request packet to virtual switch 112. The ARP request packet may include a broadcast MAC address. Accordingly, virtual switch 112 may broadcast the ARP request packet on all virtual ports of virtual switch 112 to reach all the entities (e.g., virtual machines) in the physical network 130 (including entities such as virtual machines, connected to virtual networks, executing on hosts connected to the physical network 130) to resolve the destination IP address, for example, as explained in greater detail below with reference to FIG. 2. Additionally, it should be noted that there may be an aging mechanism implemented in the ARP cache which removes entries in the ARP cache periodically. This interval may be several minutes in length, depending on the implementation of different Operating Systems. Thus, due to this aging mechanism, ARP requests packets may be broadcasted periodically. According to aspects, after the destination virtual machine receives the ARP request packet, it may send back an ARP reply with its MAC address to the virtual machine 140, after which the two virtual machines may then begin to communicate with each other.

Figure 2:
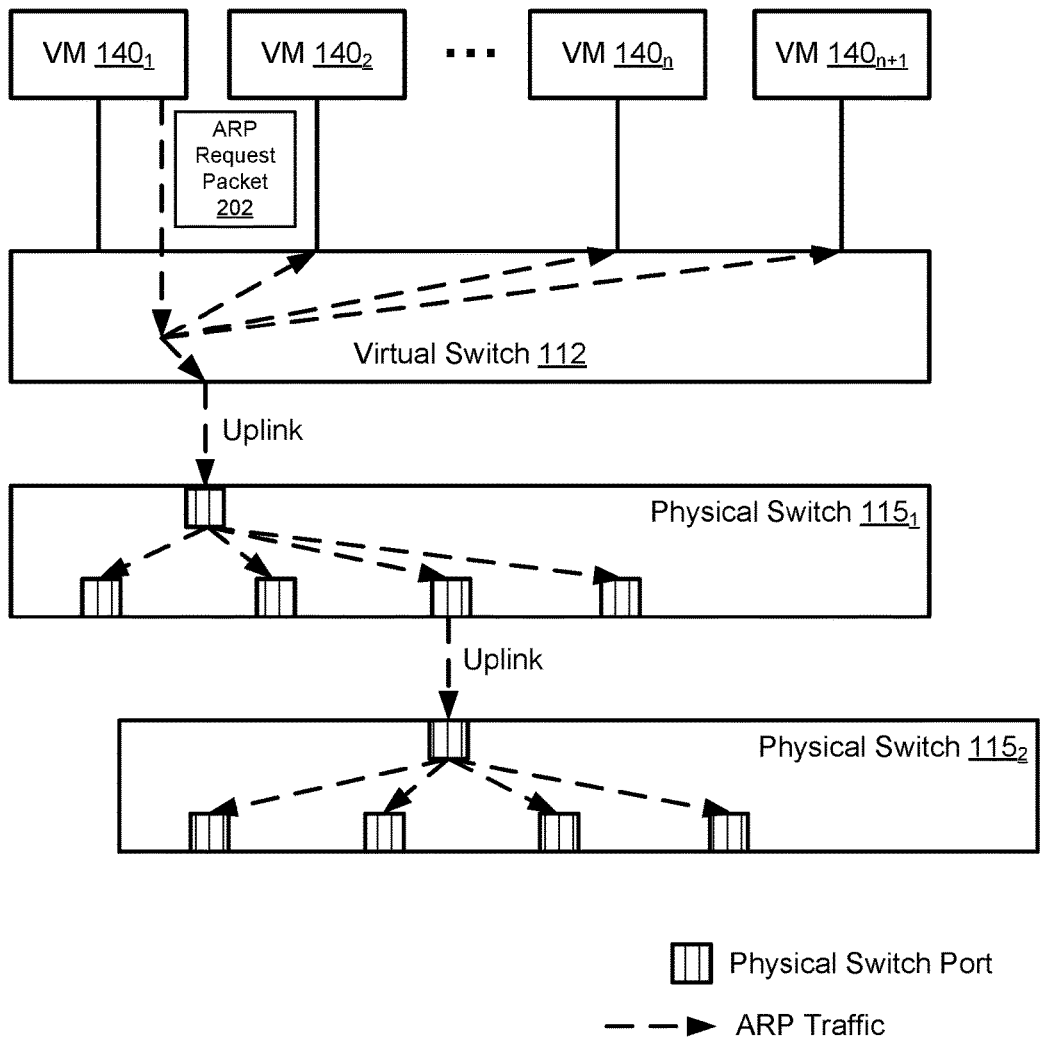
FIG. 2 illustrates address resolution protocol traffic flow in an L2 network, according to some embodiments.

FIG. 2 illustrates ARP traffic flow in a network, according to certain aspects of the present disclosure. As illustrated, when a virtual machine (e.g., VM $140_1$) wants to communicate with another virtual machine (e.g., a destination VM) in the network whose MAC address does not appear in its ARP cache, VM $140_1$ transmits an ARP request packet 202 to virtual switch 112. According to aspects, the destination MAC address of an ARP request packet may be set to a broadcast MAC address (e.g., FF:FF:FF:FF:FF:FF), which causes the ARP request packet to be flooded on all the virtual ports of the virtual switch 112.

For example, as illustrated, upon receiving an ARP request packet 202 from the VM $140_1$, the virtual switch 112 may duplicate the ARP request packet and transmit the duplicated ARP request packet on each virtual port of virtual switch 112 corresponding to the network. For example, virtual switch 112 may forward the ARP request packet on each virtual port to which a VM 140 (e.g., VM $140_2$-VM $140_{n+1}$) is connected, and further to a virtual port (also referred to as an uplink port) where virtual switch 112 connects to a physical switch $115_1$ (e.g., of physical network 130 via PNIC 102) to access entities outside host machine 100 implementing virtual switch 112. In physical switch $115_1$, the ARP request packet may also get duplicated and flooded to all the physical switch ports in physical switch $115_1$ and may even traverse another physical switch $115_2$ and be duplicated and flooded to all the physical switch ports in that physical switch.

The ARP request packet duplication behavior described above presents several issues. For example, such ARP request packet duplication may utilize CPU and memory resources in host machine 100. For example, virtual switch 112 is tasked with duplicating the ARP request packet multiple times according to the number of ports in virtual switch 112 corresponding to the network and sending out the packets even though the destination virtual machine may be connected to the same virtual switch (i.e., virtual switch 112) as the source virtual machine (i.e., the virtual machine that initially transmits the ARP request packet). Moreover, each of the recipients of the ARP request packets needs to process these packets, causing additional utilization of CPU and memory resources. Additionally, the CPU and memory resource use may increase as the number of virtual ports in the virtual switch 112 increases. Further, this problem also exists in the situation where hypervisor 105 receives additional ARP broadcast packets from an external network (e.g., physical network 130) and needs to process such received ARP broadcast packets.

Further, the duplicate ARP request packets which flow into a physical switch through an uplink port also get duplicated in the physical switch and sent to all the switch ports in the network, which utilizes network bandwidth. Additionally, every VM and host in the network has to check if the duplicate ARP request packets are addressed to itself, which also increases CPU and memory resource utilization in each VM and host.

Accordingly, aspects of the present disclosure propose techniques to alleviate such issues related to ARP requests in a network with hosts running virtual machines, for example, when a destination virtual machine's MAC address is unknown to a source virtual machine. In some cases, this may involve leveraging a hypervisor's knowledge about the network entities implemented by the hypervisor (e.g., VMs, virtual ports, uplink ports, etc.) to prevent redundant ARP request packets from being generated and sent out when a destination virtual machine resides on the same virtual switch as the source virtual machine.

According to aspects, preventing redundant ARP request packets from being broadcast through an entire network may be accomplished by maintaining an IP address-to-port identifier (port ID) mapping table (PIMT) in the virtual switch. According to aspects, when an ARP request packet is received at a virtual switch (e.g., virtual switch 112), the virtual switch may determine whether a destination address (e.g., IP address) in the ARP request packet matches an entry in the PIMT. If so, the virtual switch may route the ARP request packet to the correct destination virtual machine, for example, via a corresponding port ID determined from the PIMT. If not, the virtual switch may allow the ARP request packet to be broadcast.

Figure 3:
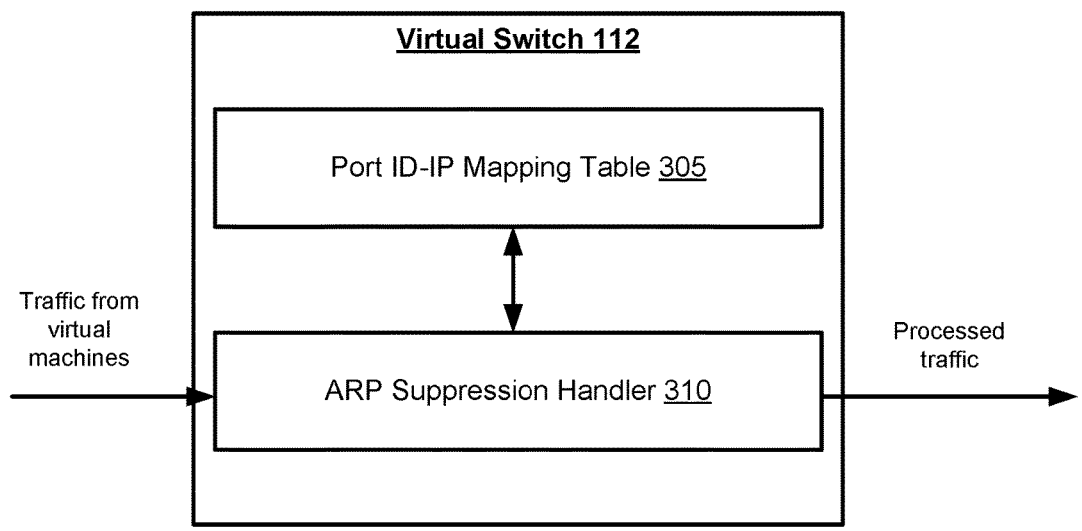
FIG. 3 is a block diagram of components of a virtual switch that may be used to process address resolution protocol requests, according to some embodiments.

FIG. 3 illustrates a virtual switch configured to suppress redundant ARP request packets, according to certain aspects of the present disclosure. As illustrated, each virtual switch 112 may comprises a PIMT 305 for mapping IP addresses to port numbers in virtual switch 112 and an ARP Suppression Handler (ASH) 310 for routing traffic received at virtual switch 112 to the proper entity in the network based on one or more entries in PIMT 305.

As noted, PIMT 305 comprises a list of IP addresses associated with entities (e.g., VMs) and their corresponding virtual ports in virtual switch 112. Table 1, below, illustrates an example PIMT 305. For example, as illustrated, IP Address 1 (which may be associated with a first VM coupled to port 1 of virtual switch 112) may correspond to Port ID 1, IP Address 2 (which may be associated with a second VM coupled to port 2 of virtual switch 112) may correspond to Port ID 2, and so on.

TABLE 1

| IP Address | Port ID |
| --- | --- |
| IP Address 1 | Port ID 1 |
| IP Address 2 | Port ID 2 |
| IP Address 3 | Port ID 3 |
| IP Address 4 | Port ID 4 |
| ... | ... |

According to certain aspects, ASH 310 may receive a packet from a VM. Assuming the received packet is an ARP request packet, ASH 310 may check the destination IP address in the ARP request packet and determine whether the destination IP address maps to any port IDs in PIMT 305. If the destination IP address in the ARP request packet matches a port ID in PIMT 305, ASH 310 forwards the ARP request packet to the port in the virtual switch 112 corresponding to the determined port ID. For example, with reference to table 1, ASH 310 may receive an ARP request packet with destination "IP Address 1", check PIMT 305 to see whether "AP Address 1" matches any port IDs, and forwards the ARP request packet to the port in virtual switch 112 matching "Port ID 1". Accordingly, instead of virtual switch 112 broadcasting the ARP request packet to all ports, the ARP request packet is only sent to one port of virtual switch 112. As explained in greater detail below, depending on the type of received packet, ASH 310 may perform different functions (e.g., adding and removing entries from the PIMT 305).

In some cases, if an entity is connected to an uplink port, the port ID entry in PIMT 305 may be marked "uplink" instead of the specific uplink port. In certain aspects, a virtual switch may include a plurality of uplink ports coupled to one or more PNICs for accessing a physical network. In this case, when receiving a packet whose destination IP address maps to "uplink", ASH 310 may select a particular uplink port as the target port based, for example, on a load balancing policy. Table 2, below, illustrates an example PIMT 305 containing "uplink" port entries.

| IP Address | Port ID |
| --- | --- |
| IP Address n | Port ID m |
| IP Address n + 1 | Uplink |

-continued

| IP Address | Port ID |
| --- | --- |
| IP Address n + 2 | Uplink |
| IP Address n + 3 | Uplink |
| ... | ... |

As noted, each virtual switch 112 includes ASH 310, which is responsible for using PIMT 305 to efficiently route ARP request packets as well as maintaining PIMT 305 (e.g., adding and removing entries) based on the types of received packets.

For example, in some cases, ASH 310 may detect new Port ID-IP pairs based on packets received from one or more VMs. For example, ASH 310 may receive one or more Dynamic Host Configuration Protocol (DHCP) acknowledgement packets sent to one or more VMs and/or one or more ARP request/reply packets sent from one or more VMs. ASH 310 may update PIMT 305 with Port ID-IP pairs determined from the one or more received packets. For example, ASH 310 may receive a DHCP acknowledgement packet from a DHCP server for a VM on a first port. ASH 310 may use the IP address of the VM contained in the DHCP acknowledgement packet and the first port over which the DHCP acknowledgement packet is sent to the VM at virtual switch 112 to update PIMT 305 (e.g., adding the port ID-IP pair to PIMT 305).

In certain cases, ASH 310 may remove entries from PIMT 305. For example, in some cases, ASH 310 may detect a link-down event occurring on one or more of the ports on virtual switch 112. In this case, ASH 310 may remove entries in PIMT 305 corresponding to the downed ports. In other cases, ASH 310 may receive a DHCP release packet from a VM and may remove a corresponding entry in PIMT 305 that has the IP address included in the DHCP release packet. Additionally, in some cases, ASH 310 may maintain an aging timer associated with each entry in PIMT 305. According to certain aspects, if the timer for a particular entry in PIMP 305 expires, ASH 310 may remove that entry from PIMT 305.

As noted above, in some cases, ASH 310 may receive an ARP request packet from a source VM with an indication of a destination VM that the source VM wishes to communicate with. Based on the ARP request packet, ASH 310 updates the PIMT 305 with the IP address of the source VM. ASH 310 may then look up the IP address corresponding to the destination VM, indicated in the ARP request packet, in PIMT 305. According to aspects, if the lookup fails, ASH 310 may then allow the received ARP request packet to pass through the normal packet processing procedure of virtual switch 112, for example, where virtual switch 112 broadcasts the ARP request packet across all ports to the network. According to aspects, if an entry corresponding to the received ARP request packet is found in PIMT 305, ASH 310 directly moves the ARP request packet to an output packet list of the corresponding port, bypassing the need for further processing by virtual switch 112 and avoiding the unnecessary broadcasting throughout the virtualized computing environment.

According to aspects, ASH 310 may receive an ARP reply packet corresponding to the previously-received ARP request packet over a certain port on virtual switch 112. ASH 310 may then update the entry in the PIMT corresponding to the source IP of the VM that transmitted the ARP reply packet (i.e., the VM corresponding to the destination IP address in the ARP request packet) with the certain port the ARP reply packet is received over. According to aspects, the ARP caches in each of the source VM and destination VM may be updated based on PIMT 305. That is, the ARP cache of the source VM may be updated with the port ID of the destination VM and vice versa. The source VM and destination VM may then begin communicating directly with each other.

Figure 4:
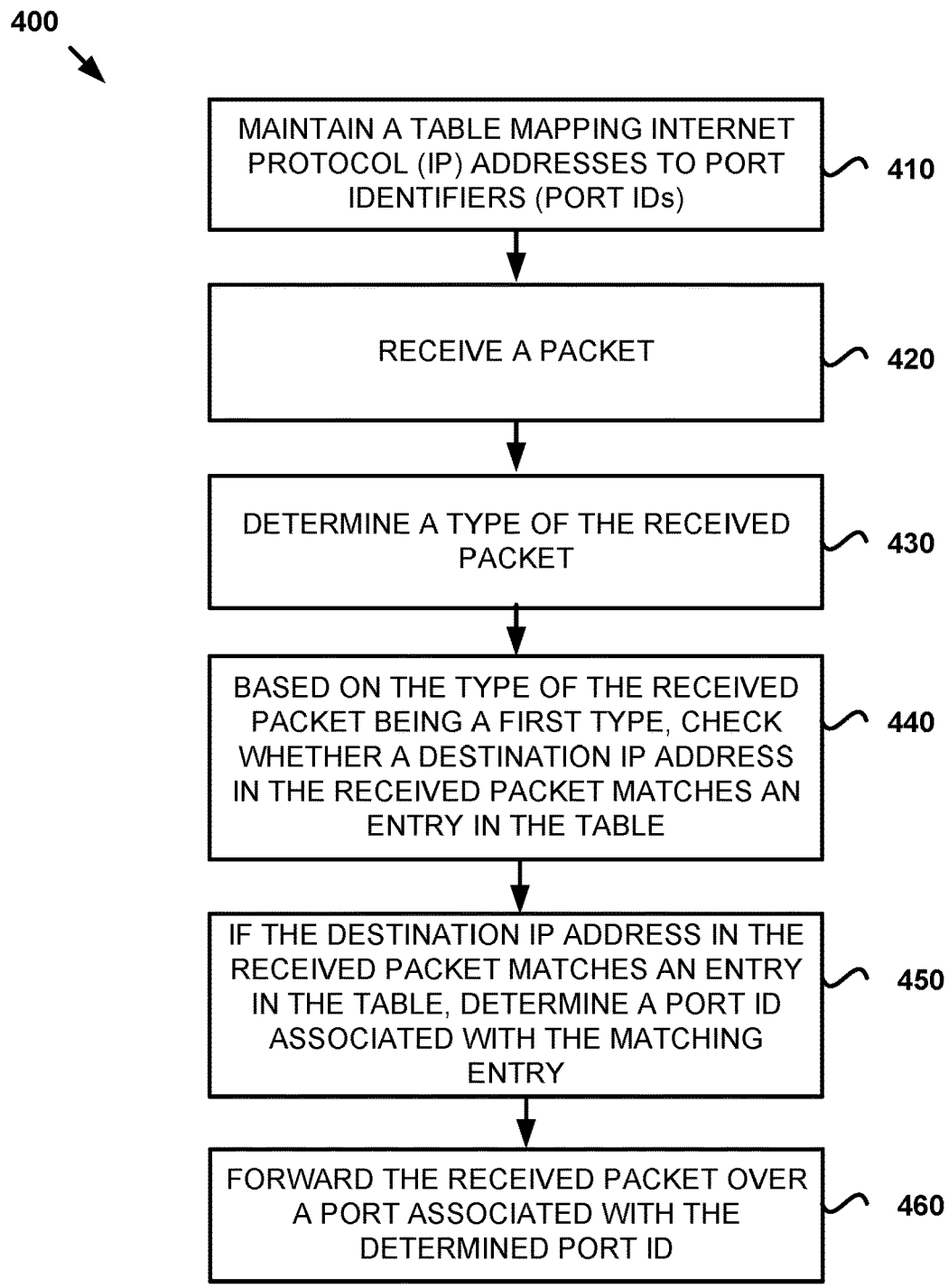
FIG. 4 illustrates example operations that may be performed by a virtual switch for processing address resolution protocol requests, according to some embodiments.

FIG. 4 illustrates example operations 400 for communication in a network, for example, for alleviating issues related to ARP requests described above. According to aspects, operations 400 may be performed, for example, by a virtual switch (e.g., virtual switch 112) or one or more entities within a virtual switch (e.g., ASH 310).

Operations 400 begin at 410 by maintaining a table mapping internet protocol (IP) addresses to port identifiers (port IDs). At 420, the virtual switch receives a packet. At 430, the virtual switch determines a type of the received packet. At 440, based on the type of the received packet being a first type, the virtual switch checks whether a destination IP address in the received packet matches an entry in the table. At 450, if the destination IP address in the received packet matches an entry in the table, the virtual switch determines a port ID associated with the matching entry. At 460, the virtual switch forwards the received packet over a port associated with the determined port ID.

Figure 5:
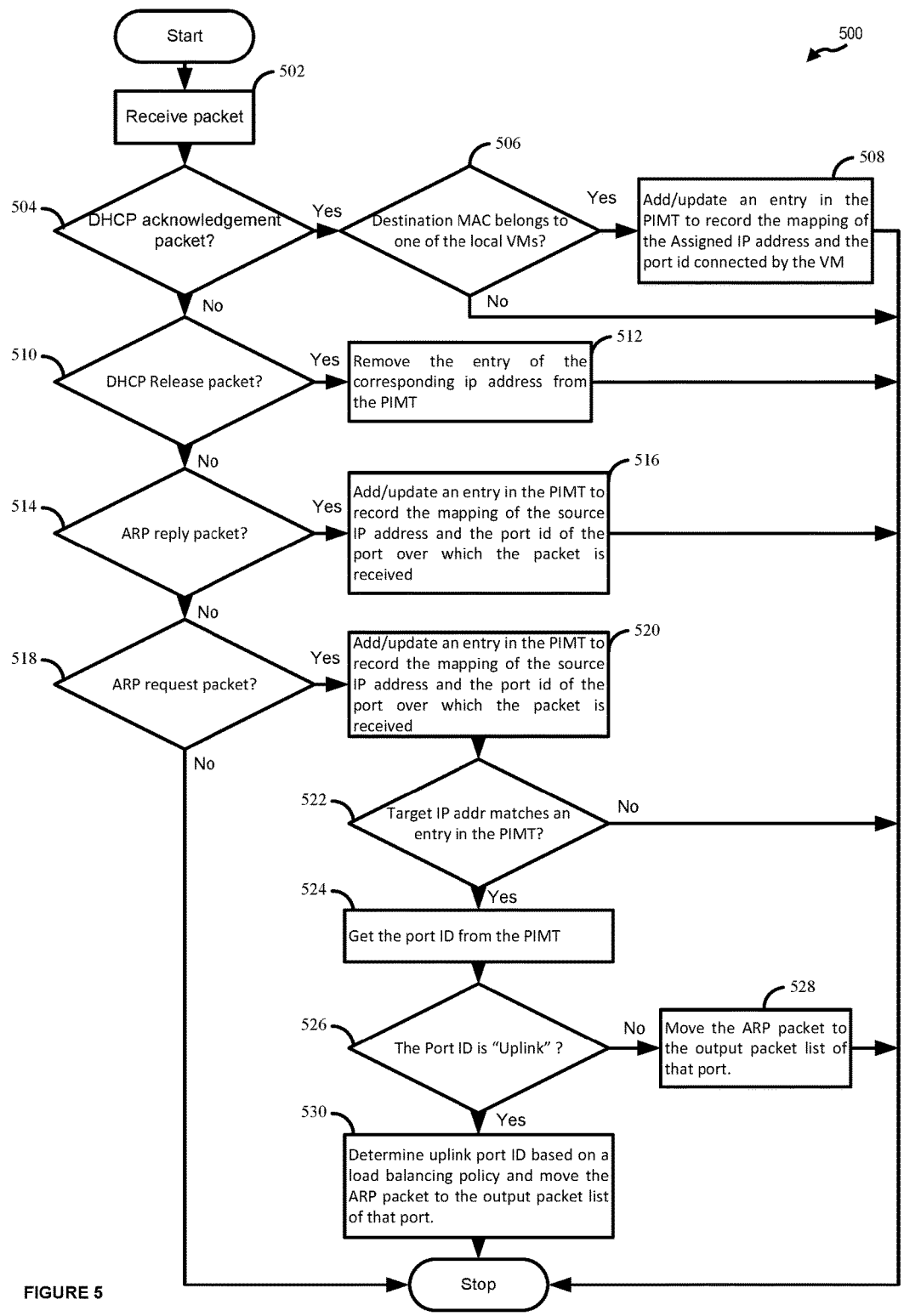
FIG. 5 is a detailed flow diagram illustrating an example process for alleviating issues related to address resolution protocol requests, according to some embodiments.

FIG. 5 is a more detailed flow diagram illustrating an example process for alleviating issues related to ARP requests, for example, as described above. According to aspects, the process illustrated in FIG. 5 may be implemented by a virtual switch (e.g., virtual switch 112) or one or more entities within a virtual switch (e.g., ASH 310).

The process in FIG. 5 begins at 502 where an ARP Suppression Handler (ASH) (e.g., ASH 310) within the virtual switch receives a packet. At 504, ASH 310 checks if the packet is a DHCP acknowledgement packet. If the received packet is a DHCP acknowledgement packet, ASH 310 checks at 506 if the received packet's destination MAC address belongs to one of the local VMs (e.g., a client served by the virtual switch 112). If the received packet's destination MAC address does belong to a local client, at 508, ASH 310 adds/updates an entry in the port ID-IP mapping table (e.g., PIMT 305) to record the mapping of the assigned IP address in the DHCP acknowledgement packet and the port ID of the port the local VM is connected. If the destination MAC address doesn't belong to any of the local VMs, ASH 310 stops processing the packet and lets the packet go through the normal packet processing procedure of virtual switch 112.

If the received packet is not a DHCP acknowledgement packet, at 510, ASH 310 checks if the received packet is a DHCP release packet. If the received packet is a DHCP release packet, at 512, ASH 310 removes the entry of the corresponding IP address of the DHCP release packet from PIMT 305. ASH 310 then stops processing the received packet and passes the received packet onto the normal packet processing procedure of virtual switch 112.

If the received packet is not a DHCP release packet, at 514, ASH 310 checks if the received packet is an ARP reply packet. If the received packet is an ARP reply packet, at 516, ASH 530 adds/updates an entry in the PIMT to record the mapping of the source IP address of the ARP reply packet and the port ID of the port over which the ARP reply packet was received. ASH 310 then stops processing the received packet and passes the received packet onto the normal packet processing procedure of virtual switch 112.

If the packet is not an ARP reply packet, at 518, ASH 310 checks if the received packet is an ARP request packet. If the received packet is an ARP request packet, at 520, ASH 310 adds/updates an entry in the PIMT 305 to record the mapping of the source IP address of the ARP request packet and the port ID of the port over which the ARP request packet was received.

At 522, ASH 310 checks if the target IP address of the ARP request packet matches an entry in the PIMT 305. If the target IP address in the ARP request packet does not match any entries in the PIMT 305, ASH 310 stops processing the ARP request packet and lets the packet go through the normal packet processing procedure of virtual switch 112 (e.g., the ARP request packet will be broadcasted). If the target IP address in the ARP request packet does match an entry in PIMT 305, ASH 310 determines the port ID corresponding to the target IP address from PIMT 305 at 524.

At 526, ASH 310 checks if the determined port ID is marked as "uplink". If the determined port ID is not marked as "uplink", at 528, ASH 310 directly moves the ARP request packet to the output packet list of the determined port, bypassing the normal packet processing procedure of virtual switch 112. In other words, the ARP request packet is directly routed to the port corresponding to the determined port ID, preventing the ARP request packet from being broadcast throughout the virtualized computing environment.

According to aspects, if at 526 the port is marked as "uplink", ASH 310 determines, at 530, the exact uplink port ID based on a load balancing policy of available uplink ports at virtual switch 112 and moves the ARP packet to the output packet list of that port and stops the packet processing.

According to aspects, if the received packet is not an ARP request packet either, the received packet is not relevant to ASH 310 and ASH 310 just stops processing the received packet and lets the received packet go through the normal packet processing procedure of virtual switch 112.

According to aspects, processing ARP request packets in the manner described above provides various benefits. For example, processing ARP request packets in the manner described above avoids unnecessary waste of CPU and memory resources in local host spent when duplicating and processing the ARP request packets, no matter if the ARP request packets are transmitted from the inside or the outside of the hypervisor. Additionally, it avoids the unnecessary waste of the network bandwidth of the whole network consumed by the redundant ARP request flooding. Further, it avoids the unnecessary waste of CPU and memory resources in all other machines in the network spent in duplicating and processing the ARP request packets. Moreover, by using the PIMT, IP address conflicts that occur on the virtual switch can be detected and the involved ports on the virtual switch can easily be identified, which can make the identification of the culprit of the IP address conflict much easier.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for communicating in a network, comprising:
maintaining a table mapping internet protocol (IP) addresses to port identifiers (port IDs) of ports of a Layer 2 (L2) switch;
receiving a packet at the L2 switch, the packet comprising an IP address of a destination endpoint, the packet not including a media access control (MAC) address of the destination endpoint;
determining a type of the received packet;
based on the type of the received packet being a first type, checking whether the destination IP address in the received packet matches an entry in the table;
if the destination IP address in the received packet matches an entry in the table:
determining a port ID associated with the matching entry; and
forwarding the received packet over a port of the L2 switch associated with the determined port ID and not other ports of the L2 switch; and
if the destination IP address in the received packet does not match an entry in the table, duplicating and broadcasting the received packet to all ports of the L2 switch.

2. The method of claim 1, further comprising updating the table to map a source address of the received packet to a port ID of a port of the L2 switch on which the received packet was received.

3. The method of claim 1, further comprising determining whether the determined port ID is associated with an uplink port of the L2 switch.

4. The method of claim 3, further comprising:
if the determined port ID is associated with an uplink port, determining an exact uplink port ID based on a load balancing policy.

5. The method of claim 1, wherein the received packet comprises an address resolution protocol (ARP) request packet.

6. The method of claim 1, wherein the network comprises an Open Systems Interconnection (OSI) layer 2 network.

7. The method of claim 1, further comprising, based on the received packet being a second type, at least one of:
adding entries in the table based on the type of the received packet; or
deleting entries in the table based on the type of the received packet.

8. The method of claim 1, further comprising deleting an entry in the table when a timer associated with that entry has expired.

9. The method of claim 1, wherein the L2 switch comprises a virtual switch.

10. A computer system, wherein system software for the computer system is programmed to execute a method for communicating in a network, the method comprising:
maintaining a table mapping internet protocol (IP) addresses to port identifiers (port IDs) of ports of a Layer 2 (L2) switch;
receiving a packet at the L2 switch, the packet comprising an IP address of a destination endpoint, the packet not including a media access control (MAC) address of the destination endpoint;
determining a type of the received packet;

based on the type of the received packet being a first type, checking whether the destination IP address in the received packet matches an entry in the table;

if the destination IP address in the received packet matches an entry in the table:
- determining a port ID associated with the matching entry; and
- forwarding the received packet over a port of the L2 switch associated with the determined port ID and not other ports of the L2 switch; and if the destination IP address in the received packet does not match an entry in the table, duplicating and broadcasting the received packet to all ports of the L2 switch.

11. The computer system of claim 10, wherein the method further comprises updating the table to map a source address of the received packet to a port ID of a port of the L2 switch on which the received packet was received.

12. The computer system of claim 10, wherein the received packet comprises an address resolution protocol (ARP) request packet.

13. The computer system of claim 10, wherein the network comprises an Open Systems Interconnection (OSI) layer 2 network.

14. The computer system of claim 10, wherein the method further comprises, based on the received packet being a second type, at least one of:
- adding entries in the table based on the type of the received packet; or
- deleting entries in the table based on the type of the received packet.

15. The computer system of claim 10, wherein the method further comprises deleting an entry in the table when a timer associated with that entry has expired.

16. The computer system of claim 10, wherein the L2 switch comprises a virtual switch.

17. A computer system for communicating in a network, comprising:
- a memory; and
- a processor configured to:
  - maintain a table mapping internet protocol (IP) addresses to port identifiers (port IDs) of ports of a Layer 2 (L2) switch;
  - receive a packet at the L2 switch, the packet comprising an IP address of a destination endpoint, the packet not including a media access control (MAC) address of the destination endpoint;
  - determine a type of the received packet;
  - based on the type of the received packet being a first type, check whether the destination IP address in the received packet matches an entry in the table;
  - if the destination IP address in the received packet matches an entry in the table:
    - determine a port ID associated with the matching entry; and
    - forward the received packet over a port of the L2 switch associated with the determined port ID and not other ports of the L2 switch; and
  - if the destination IP address in the received packet does not match an entry in the table, duplicate and broadcast the received packet to all ports of the L2 switch.

18. The computer system of claim 17, wherein the processor is further configured to, based on the received packet being a second type, at least one of:
- add entries in the table based on the type of the received packet; or
- delete entries in the table based on the type of the received packet.

19. The computer system of claim 17, wherein the received packet comprises an address resolution protocol (ARP) request packet.

20. The computer system of claim 17, wherein the L2 switch comprises a virtual switch.

* * * * *